United States Patent
Jin et al.

(10) Patent No.: US 7,295,730 B2
(45) Date of Patent: Nov. 13, 2007

(54) GLASS PACKAGE FOR OPTICAL DEVICE

(75) Inventors: Xingang Jin, Shanghai (CN); Fahua Lan, Shanghai (CN); Junfei Zhang, Shanghai (CN); Kang Lin, Cupertino, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 11/292,735

(22) Filed: Dec. 2, 2005

(65) Prior Publication Data

US 2007/0127867 A1    Jun. 7, 2007

(51) Int. Cl.
G02B 6/32    (2006.01)
G02B 6/34    (2006.01)

(52) U.S. Cl. .............................. 385/33; 385/37; 385/50; 385/51

(58) Field of Classification Search ................. 385/27, 385/33, 34, 37, 39, 41, 43, 47, 88–90
See application file for complete search history.

(56) References Cited

U.S. PATENT DOCUMENTS

| | | | |
|---|---|---|---|
| 5,600,741 A * | 2/1997 | Hauer et al. .................. 385/35 |
| 6,185,347 B1 * | 2/2001 | Zheng ........................... 385/34 |
| 6,282,339 B1 * | 8/2001 | Zheng ........................... 385/34 |
| 6,343,166 B1 * | 1/2002 | Hellman et al. ............... 385/31 |
| 6,347,170 B1 * | 2/2002 | Zheng ........................... 385/34 |
| 6,374,012 B1 * | 4/2002 | Bergmann et al. ............. 385/33 |
| 6,621,954 B1 * | 9/2003 | Xie et al. ....................... 385/33 |
| 6,854,900 B2 * | 2/2005 | Lai et al. ........................ 385/80 |
| 7,016,565 B2 * | 3/2006 | Hsia et al. ..................... 385/34 |
| 7,068,883 B2 * | 6/2006 | Ludington et al. ............ 385/33 |
| 2003/0063853 A1 | 4/2003 | Huang et al. |
| 2003/0103725 A1 | 6/2003 | Li |
| 2005/0248819 A1 * | 11/2005 | Hymel et al. .................. 359/15 |

* cited by examiner

*Primary Examiner*—Hemang Sanghavi
*Assistant Examiner*—Omar Rojas
(74) *Attorney, Agent, or Firm*—North Weber & Baugh LLP

(57) ABSTRACT

A glass optical filter is described that optically connects two optical fibers and may filter a single or group of channels from a WDM signal that is being communicated between the optical fibers. The glass optical filter may be comprised of two pigtail tubes having smaller interior diameters than a center piece tube that couples the two pigtail tubes together. In one embodiment of the invention, D-lenses are positioned within the glass optical filter and function as focusing lenses. The characteristics of the glass housing and D-lens provide a preferred environment for aligning optical fiber pigtails to the focusing lenses.

16 Claims, 10 Drawing Sheets

D Lens

C Lens

GRIN Lens

A Lens

Optical Filter

**Glass Optical Filter

D Lens

D Lens

Optical Filter with D Lens

GLASS PACKAGE FOR OPTICAL DEVICE

BACKGROUND

A. Technical Field

The present invention relates generally to optical networking technology, and more particularly, to a glass package for optical devices, such as an optical filter.

B. Background of the Invention

The development of optical networking technologies has provided large amounts of network capacity on which data may be communicated. This increased capacity has facilitated the development of high bandwidth applications, including multimedia, voice and video applications, which require large amounts of data to be communicated between network clients. Furthermore, other bandwidth-hungry applications are continually being developed to take advantage of the capacity provided by optical networks.

Wavelength division multiplexing technology, including dense wavelength division multiplexing and coarse wavelength multiplexing, is a significant technological advancement that has resulted in an increase of bandwidth in optical networks. A wavelength division multiplexer launches multiple data channels or wavelengths within a single optical fiber.

These channels are subsequently demuliplexed at a receiver and routed within the network. The number of channels within a WDM network is the primary determinant in the amount of bandwidth within an optical network.

WDM technology also allows a service provider to expand optical network bandwidth without building out or otherwise physically expanding the network infrastructure. In particular, wavelength division multiplexing allows network capacity to be increased by transmitting additional wavelengths in the network. The number and specific wavelengths that may be communicated on the network are limited by the network configuration, the type of optical fiber and optical components within the network.

One such optical component is an optical filter that transmits a particular wavelength(s) and reflects other wavelengths. These optical filters may be applied to pump-signal combining, band splitting, coarse wave division multiplexing, dense wave division multiplexing, CATV, and other networking applications and environments.

An optical filter typically includes a wave division multiplex ("WDM") filter, a coupling or collimating lens on each side of the filter, and single fiber pigtail or dual fiber pigtail coupled to each of the coupling lenses. The components are surrounded by a housing that protects the components and secures the components within their relative positions.

FIG. 1 illustrates an exemplary housing 100 of an optical filter in which these components may be positioned. The housing 100 includes two metallic collimators tubes 110, 130 and a soldering tube 120 that are generally connected by lead-based solder. The first metallic collimator tube 110 and the second metallic collimator tube 130 contain fiber pigtails and coupling lenses. The soldering tube 120 contains a filter chip, filter cylinder and a filter holder.

An incident light passes through a fiber pigtail in the first metallic collimator tube 110 and is focused onto a coating film on the WDM filter, located in the holder cylinder within the soldering tube 120, by the first coupling lens. A single or group of wavelengths pass through the WDM filter and the second coupling lens focuses the filtered wavelength(s) into the transmission port of the other fiber pigtail in the second metallic collimator tube 130. Other wavelengths may be reflected by the WDM filter into a reflection port of the fiber pigtail by the first coupling lens. It is important that the components within the housing 100 are properly aligned.

The metallic housing 100 may affect the performance of the optical filter as it expands and contracts in relation to temperature. In particular, the coefficient of thermal expansion ("CTE") of the metal and solder of the housing 100 makes it relatively sensitive to temperature. The expansion/contraction of the housing 100, caused by significant changes in temperature, may affect the position and/or shape of components therein, which may reduce the performance of the filter.

The metallic tubes and lead-based solder within the housing 100 may also contain hazardous materials that are prohibited by various standards or directives. For example, Directive 2002/95/EC of the European Parliament and of the Council of 27 Jan. 2003 on the restriction of the use of certain hazardous substances in electrical and electronic equipment ("RoHS") which prohibits certain material, including lead, from being within the optical filter must be complied with in order to sell certain electronic components in Europe. Other metallic substances are also banned by RoHS or other standards.

The focusing lenses may affect the performance and size requirements of the optical filter. Various types of lenses have been employed as the coupling lenses within optical WDM filters including C-lenses, gradient index ("GRIN") lenses, and A-lenses. Each of these lenses has certain optical characteristics that are both advantageous and disadvantageous when applied to the optical filter.

FIG. 2 illustrates an exemplary C-lens that may be used within the optical filter. The C-lens 210 receives an incident light beam and focuses the light on a focus plane 240. The C-lens 210 has a focus length 230 that is defined as the distance between a focusing surface 220 of the C-lens 210 and the focus plane 240. The focus length 230 for the C-lens is typically about 1.9 millimeters. A C-lens 210 typically has a relatively low insertion loss and a CTE of less than $6 \times 10^{-6}/C$.

In order for the C-lens 210 to operate properly within a WDM filter, the C-lens 210 must be properly located relative to its focus length 230 and the focus plane 240. Accordingly, the relatively large focus length 230 limits the amount of any reduction in size of the WDM filter.

FIG. 3 illustrates an exemplary GRIN lens that may be used within the optical filter. The GRIN lens 310 receives an incident light beam and focuses the light on a focus plane 330. The GRIN lens 310 has a corresponding distance 340 between a focusing surface 320 of the GRIN lens 310 and the focus plane 330. This distance 340 for the GRIN lens is typically less than 0.25 millimeters. A GRIN lens 310 typically has a CTE of less than $10 \times 10^{-6}/C$.

The GRIN lens 310 may not be preferred for high power applications because of irreversible property changes of the dopants during its operation. These dopants may be introduced into the GRIN lens 310 as a result of continuous long-term exposure to intense light.

FIG. 4 illustrates an exemplary A-lens that may be used within the optical filter. The A-lens 420 is surrounded by a metal ring 410 and receives an incident light beam which it focuses on a focus plane 450. The A-lens 420 has a focus length 440 that is defined as the distance between a focusing surface 430 of the A-lens 420 and the focus plane 450. The focus length 440 for the A-lens 420 is typically about 1.9 millimeters.

The use of an A-lens within a WDM filter increases the relative manufacturing cost of the device. This increase in manufacturing cost is caused by the physical structure of the A-lens. Additionally, the A-lens has a relatively longer focus length 440 which may negatively affect the size of the filter.

Accordingly it is desirable to provide an apparatus and method that address the limitations of the prior art.

SUMMARY OF THE INVENTION

A glass optical filter is described that optically connects two optical fibers and may filter a single or group of channels from a WDM signal that is being communicated between the optical fibers. In one embodiment of the invention, the optical filter includes two D-lenses that operate as focusing or collimator lenses. The first D-lens focuses an optical signal onto a WDM filter that allows a wavelength(s) to pass and reflects other wavelengths to a reflective port. The second D-lens focuses the filtered wavelength(s) into a transmission port of an optical fiber.

The glass housing may be comprised of two glass pigtail tubes and a glass center piece tube that are secured by an epoxy that secures the three tubes together after curing. In one embodiment of the invention, the inner diameters of the pigtail tubes are smaller than the inner diameter of the center piece tube so that additional space is provided for alignment of pigtails to focusing lenses. Additionally, a glass tube package may be used to surround the secured tubes. In one embodiment, the glass housing protects and secures two D-lenses that operate as focusing lenses, a filter chip and filter holder. A first D-lens focuses an incident light signal on a WDM filter which passes a single or group of optical channels and reflects the remaining channels. A second D-lens focuses the filtered optical signal into a transmission port of an optical fiber pigtail. The first D-lens may focus any reflected channels into a reflective port in a corresponding fiber pigtail.

The glass optical filter offers significant performance advantages, compliance with RoHS and other standards, and is less expensive than its metallic counterparts. The glass optical filter has a relatively lower coefficient of thermal expansion and thus is less sensitive to temperature change. Additionally, the glass material comprising the pigtail and center piece tubes, and the epoxy material used to secure the tubes, does not contain metallic substances. Accordingly, the glass optical filter is complaint with standards relating to hazardous material.

The D-lenses also offer distinct advantages in their combination with the glass housing. In particular, the D-lens focus length allows for a relatively compact design of the glass optical filter. The D-lens also allows for different angles of a pigtail depending on whether a single or dual fiber pigtail is used.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

A glass optical filter is described that optically connects two optical fibers and may filter a single or group of channels from a WDM signal that is being communicated between the optical fibers. The glass optical filter may be comprised of two pigtail tubes having smaller interior diameters than a center piece tube that couples the two pigtail tubes together. In one embodiment of the invention, D-lenses are positioned within the glass optical filter and function as focusing lenses. The characteristics of the glass housing and D-lens provide a preferred environment for aligning optical fiber pigtails to the focusing lenses. In particular, a larger space between a D-lens and a pigtail is provided and a more dynamic angle allowance that allows for optimization of return loss and polarization dependent loss.

In the following description, for purpose of explanation, specific details are set forth in order to provide an understanding of the invention. It will be apparent, however, to one skilled in the art that the invention may be practiced without these details. One skilled in the art will recognize that embodiments of the present invention, some of which are described below, may be incorporated into a number of different devices including WDM optical components such as WDM multiplexers and demultiplexers. The embodiments of the present invention may also be present in glass and substances having similar properties of glass. Structures and devices shown below in block diagram are illustrative of exemplary embodiments of the invention and are meant to avoid obscuring the invention. Furthermore, connections between components and/or modules within the figures are not intended to be limited to direct connections. Rather, data between these components and modules may be modified, re-formatted or otherwise changed by intermediary components and modules.

Reference in the specification to "one embodiment" or "an embodiment" means that a particular feature, structure, characteristic, or function described in connection with the embodiment is included in at least one embodiment of the invention. The appearances of the phrase "in one embodiment" in various places in the specification are not necessarily all referring to the same embodiment.

A. Optical Filter Overview

Figure 1:
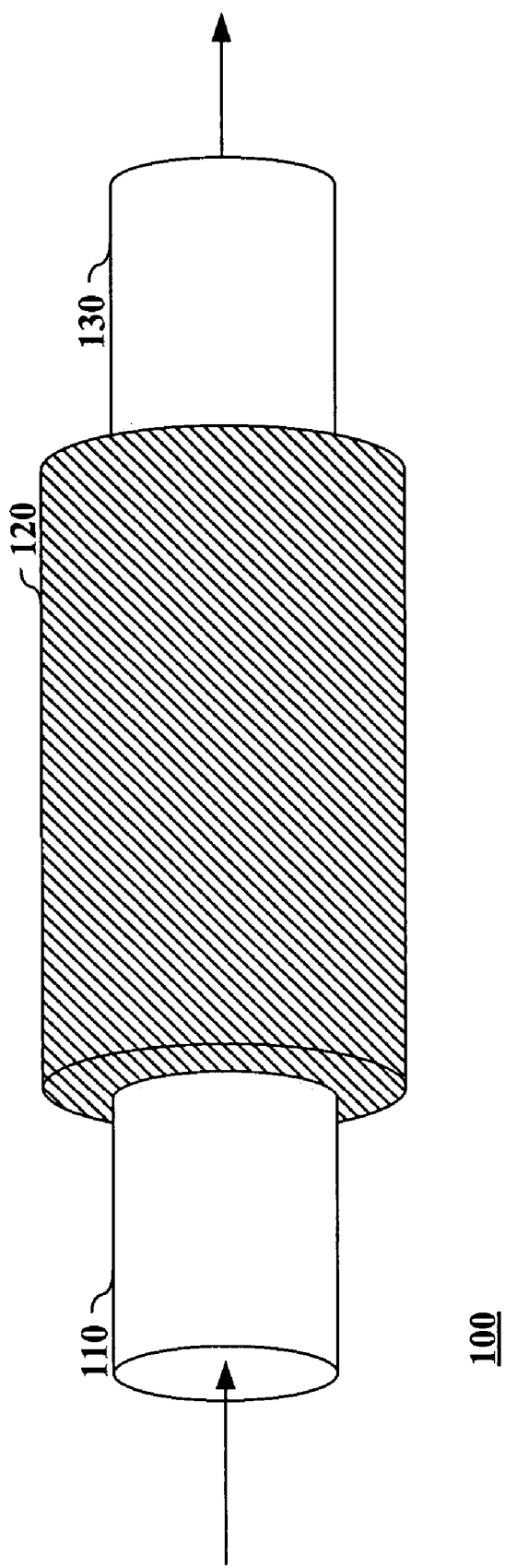
FIG. 1 is an illustration of a prior art metallic optical device housing.
Figure 2:
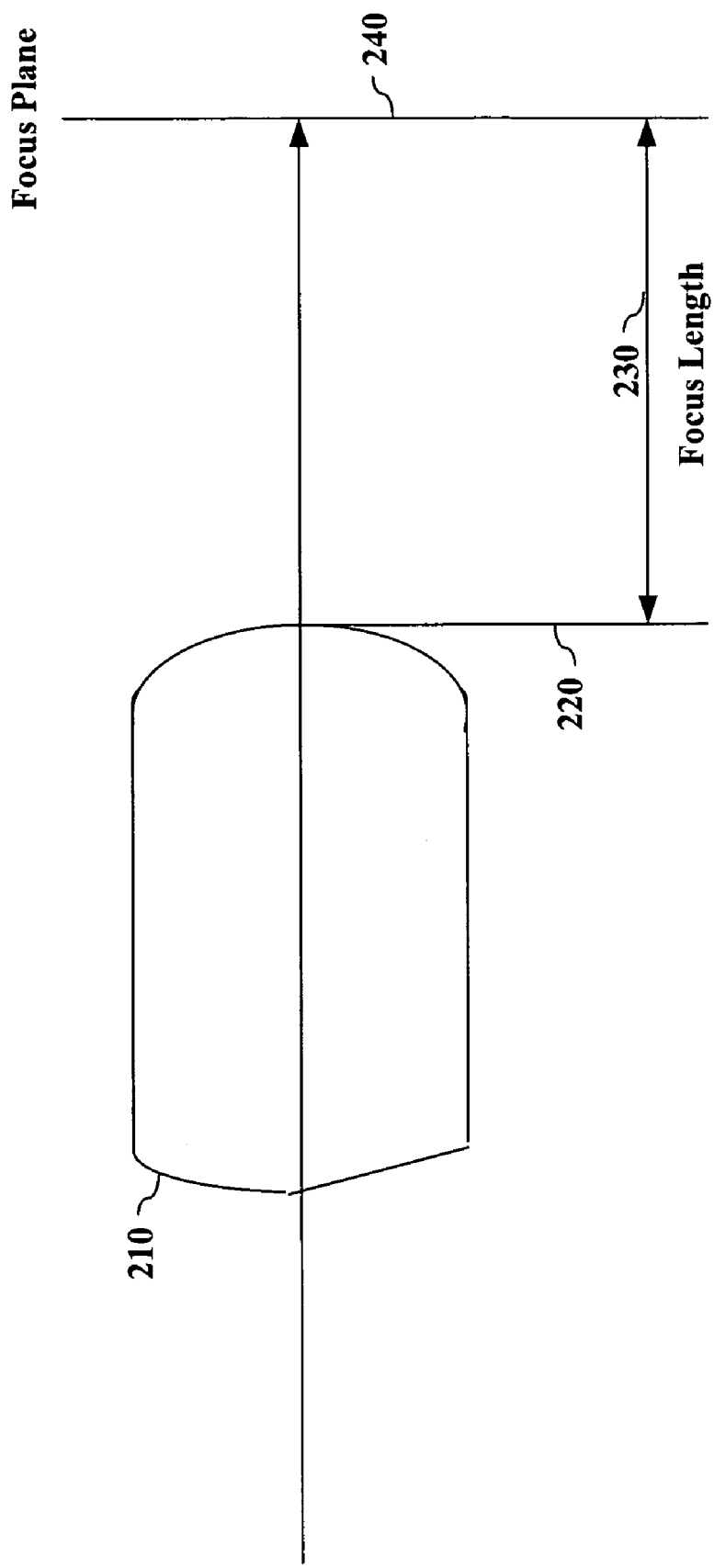
FIG. 2 is an illustration of a C lens and certain optical characteristics thereof.
Figure 3:
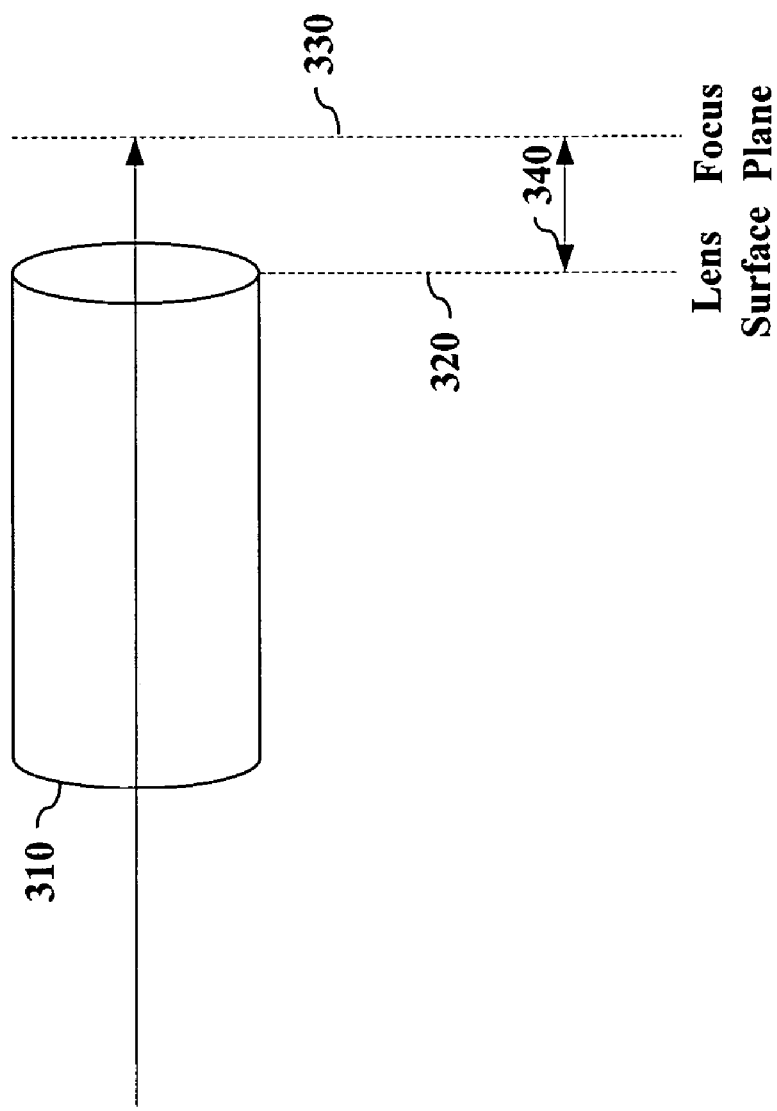
FIG. 3 is an illustration of a GRIN lens and certain optical characteristics thereof.
Figure 4:
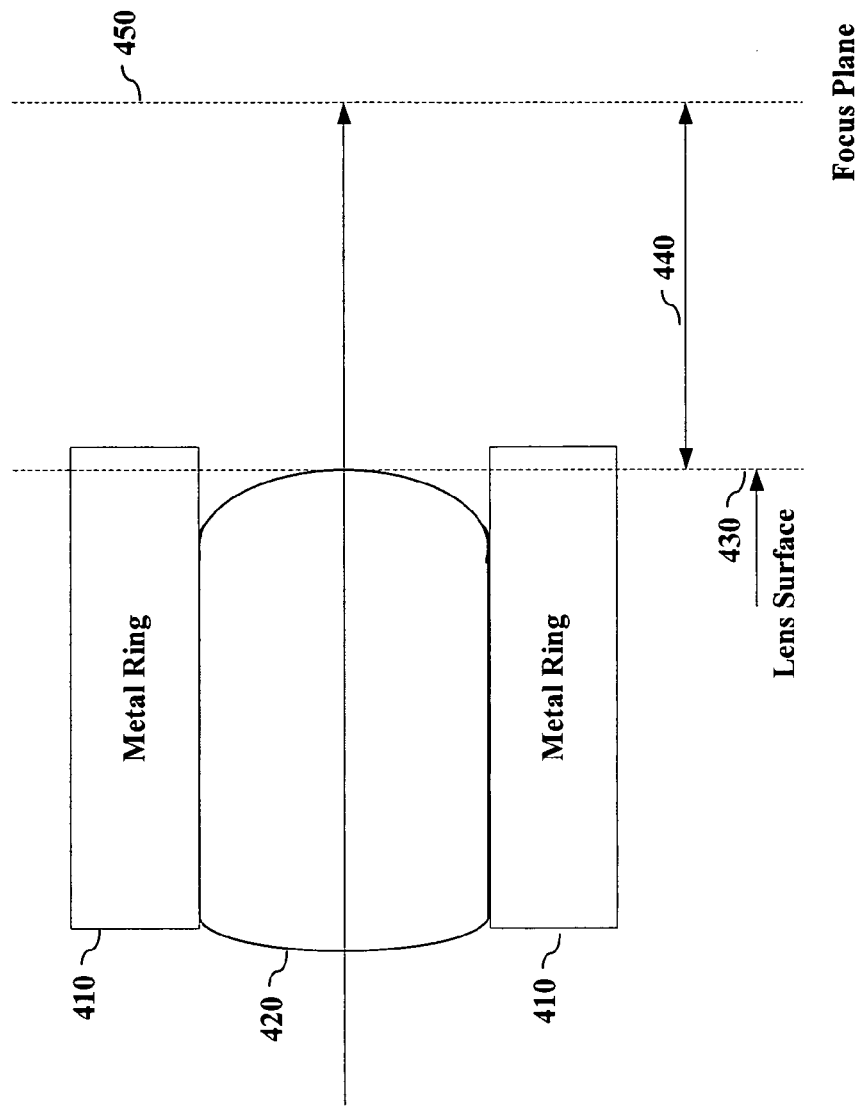
FIG. 4 is an illustration of an A lens and certain optical characteristics thereof.
Figure 5:
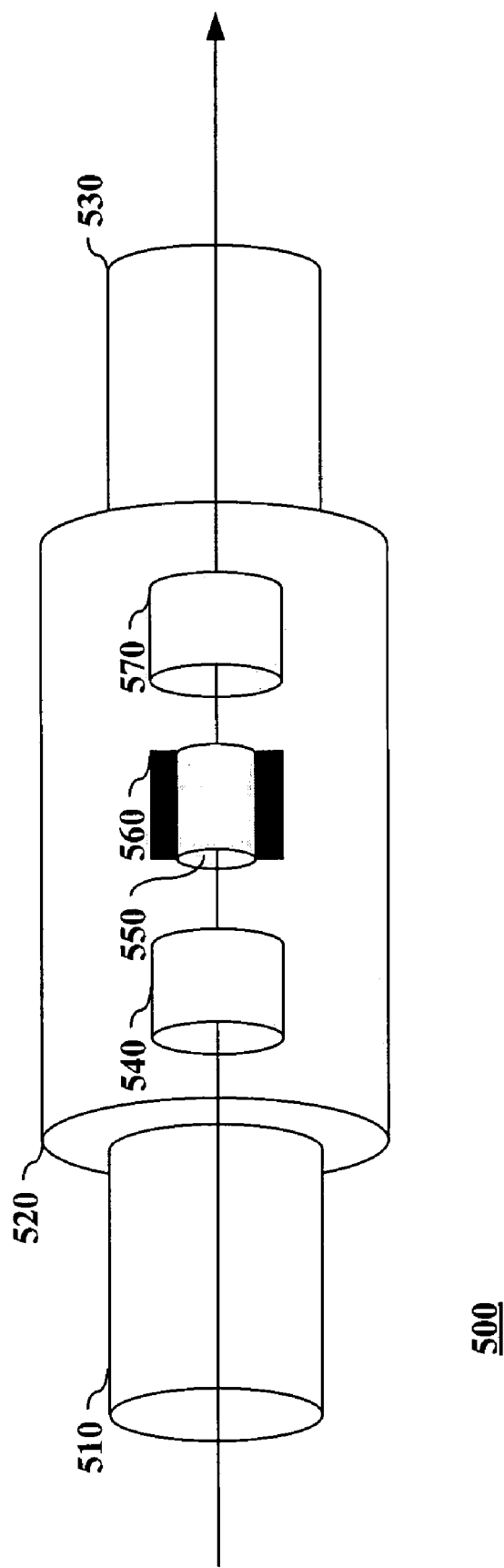
FIG. 5 is a cross-sectional illustration of an optical filter according to one embodiment of the present invention.

FIG. 5 is a cross-sectional illustration of an optical filter, which may be used to filter a WDM signal and optically couple a dual fiber pigtail and a single fiber pigtail, according to one embodiment of the invention. The optical filter 500 has a housing comprised of glass or another substance with similar characteristics of glass. The housing has a first pigtail tube 510, a center piece tube 520, and a second pigtail tube 530. The three tubes may be secured by using an epoxy resin that couples the tubes together after the resin is cured.

The housing surrounds a plurality of optical components that are used to filter an optical signal. In one embodiment, the optical filter 500 filters a WDM signal to a single or group of optical channels. The first pigtail tube 510 surrounds an optical dual fiber pigtail in which a WDM signal is communicated. The WDM signal passes through a first focusing lens 540, comprising a D-lens, which focuses the incident WDM signal onto a WDM filter 550. The WDM filter 550 is secured by a filter holder 560 within the center piece tube 520. The WDM filter 550 is designed to pass a single or group of wavelengths and reflect the remaining wavelengths.

A filtered optical signal is focused by a second focusing lens 570, comprising a D-lens, onto a transmission port of a single fiber pigtail that is secured within the second pigtail tube 530. The filtered optical signal is then communicated within the single mode fiber.

In one embodiment, the WDM filter 550 reflects at least one wavelength back into a receptive port in the dual fiber pigtail. This reflected wavelength may be communicated in one of multiple receptive ports within the dual fiber pigtail. One skilled in the art will recognize that various types of WDM filters may be used within the optical filter including a grating-based filter.

In another embodiment, the optical filter 500 optically couples a single mode fiber to another single mode fiber. In yet another embodiment, the optical filter 500 optically couples a dual mode fiber to another dual mode fiber. One skilled in the art will recognize that the optical filter 500 may optically couple different types of optical fiber with varying optical characteristics.

The optical filter 500 is less sensitive to temperature changes because of the temperature characteristics of the glass housing. In one embodiment, a glass borate compound is used to manufacture the three tubes 510, 520, 530. This compound has a relatively low CTE resulting in less physical expansion/contraction of the housing relative to temperature changes, which results in better temperature stability of the optical filter 500.

The glass housing offers other advantages its metallic counterpart. For example, the glass housing is manufactured without using high temperature processes, such as soldering, resulting in a low stress manufacturing environment and providing reliability over a relatively long period of time. Additionally, the glass compound is relatively less expensive than its metallic compounds. Furthermore, because the housing does not contain metallic substances, the optical filter is RoHS compliant.

Figure 6:
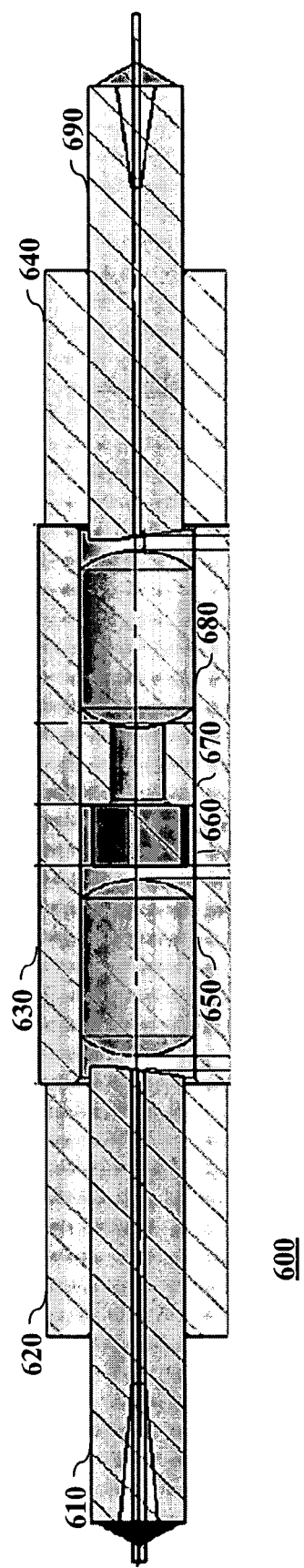
FIG. 6 is a cross-sectional illustration of an optical filter which includes a D lens according to one embodiment of the present invention.

FIG. 6 is a more detailed cross-sectional illustration of an optical filter according to one embodiment of the invention. In one embodiment, the optical filter 600 is approximately between 28 and 29 millimeters. A first and second pigtail tubes 620, 640 are approximately 5 millimeters, and a center piece tube 630 is approximately 11 millimeters.

Gaps between fiber pigtails 610, 690 and D-lens focusing lenses 650, 680 are approximately 0.27 millimeters. A filter chip is approximately 1.20 millimeters and filter holder is approximately 1.50 millimeters. In one embodiment of the present invention, the diameter of the center piece tube 630 is larger than the diameters of the first pigtail tube 620 and the second pigtail tube 640. This difference in diameters provides for more additional space for alignment of fiber pigtail and focusing lens. For example, the first pigtail tube 620 and the second pigtail tube 640 have inner diameters of 1.8 millimeters, and the center piece tube 630 has an inner diameter of 2.2 millimeters. One skilled in the art will recognize that various different inner diameters between pigtail tube and center piece tube may be used to adjust or enhance the alignment capabilities of the optical filter 600.

B. Focusing Lenses

Figure 7:
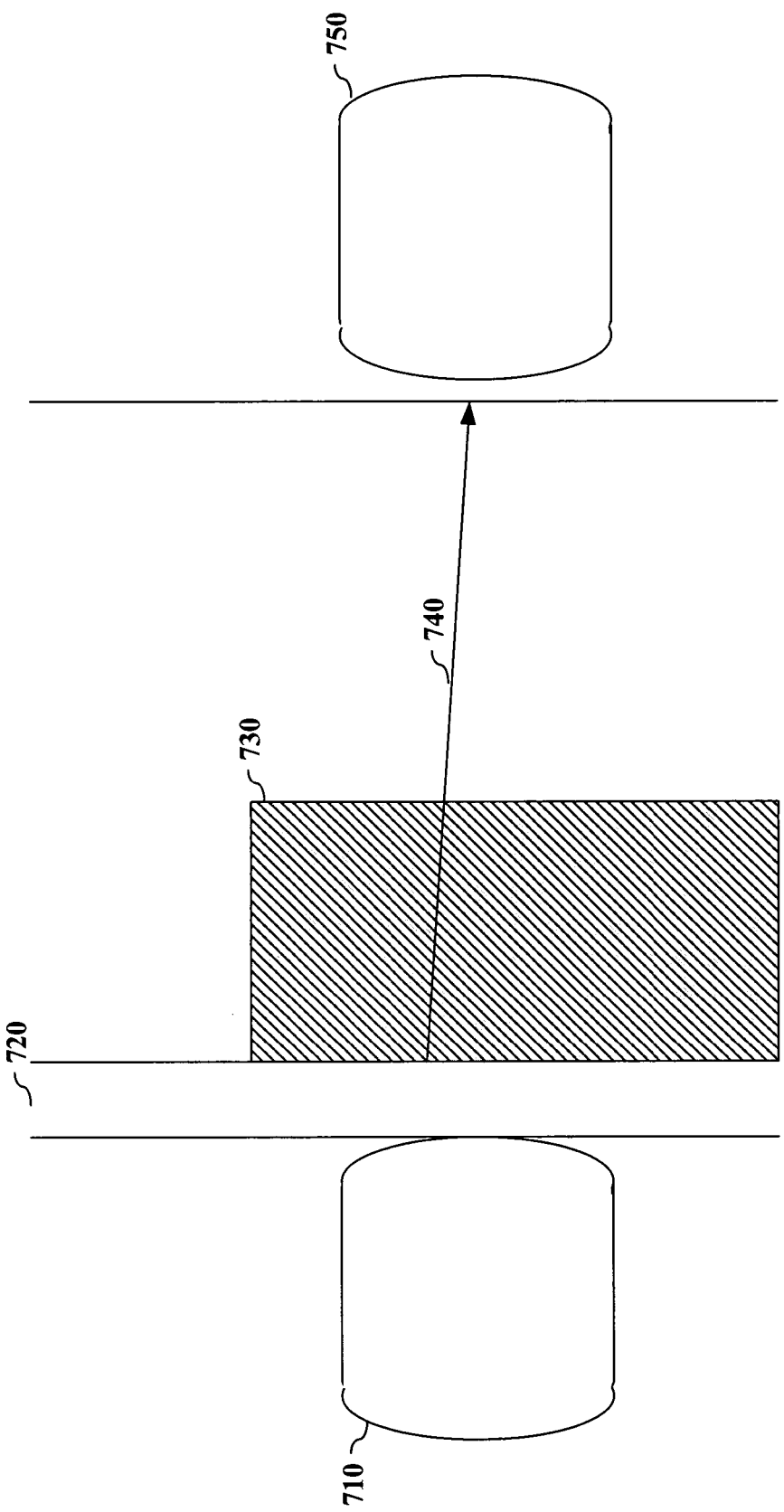
FIG. 7 is an illustration of optical filter lenses and WDM filter according to one embodiment of the invention.

FIG. 7 illustrates a WDM filter and focusing lenses according to one embodiment of the present invention. In one embodiment of the invention, a first focusing lens 710, a D-lens, is positioned relative to a WDM filter 730. A gap 720 between the first focusing lens 710 and the WDM filter 730 provides a focus length in which an incident light beam is focused on a focal plane at the WDM filter 730. In one embodiment of the invention, the gap 720 is approximately 0.25 millimeters.

A filtered beam 740, having a beam incident angle at the WDM filter 730 is defined so that the beam may reach the focus plane of a second focusing lens 750, another D-lens. In such a situation, additional walk-off is produced and if no compensation is provided then a loss will occur on a transmission port of the corresponding filter. In one embodiment of the invention, different angles of a dual fiber pigtail and a single fiber pigtail are provided to compensate a walk-off of non-4f system. For example, a 10 degree dual fiber pigtail angle and a 6 degree single fiber pigtail are employed.

The second focusing lens 750 focuses the focused incident light beam into a transmission port of an optically coupled pigtail. Reflected light from the WDM filter 730 is focused by the first focusing lens 710 into a reflective port of another optically coupled pigtail.

Figure 8:
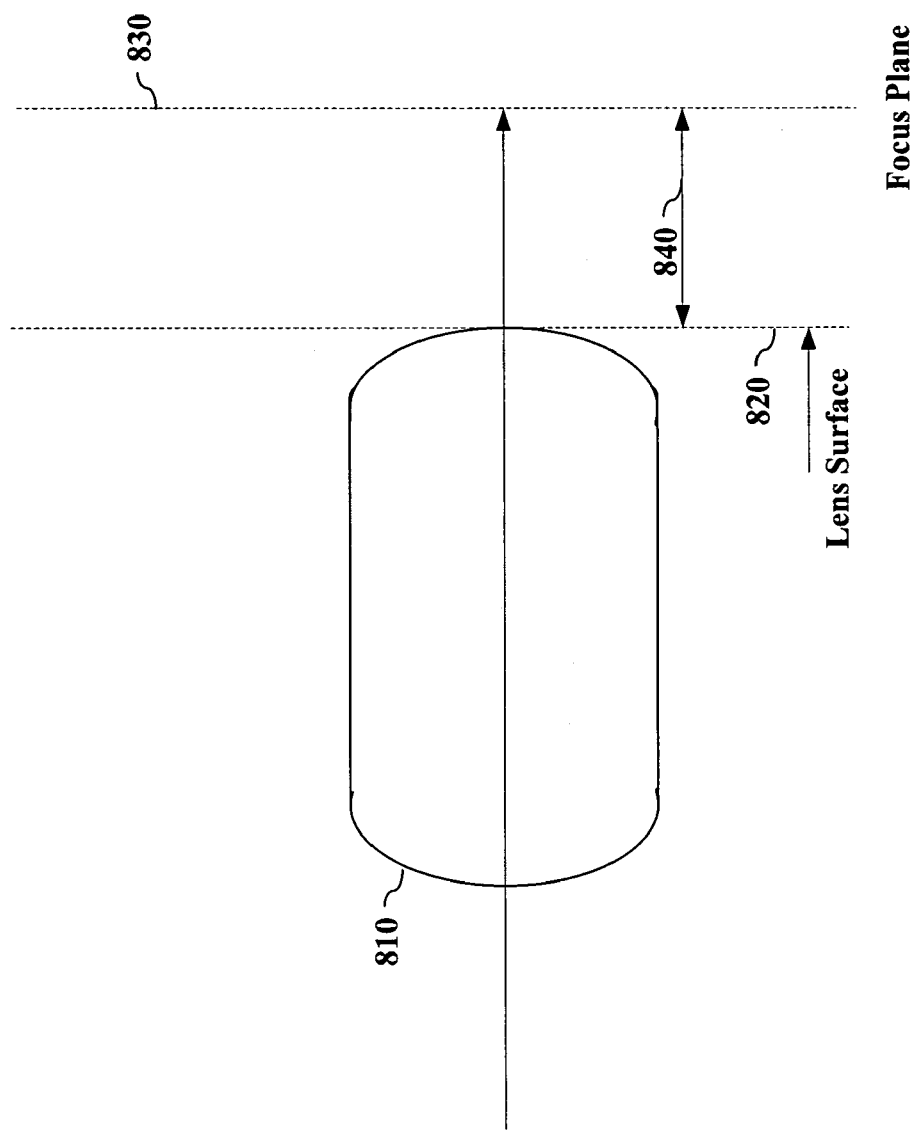
FIG. 8 is an illustration of a D lens and certain optical characteristics thereof according to one embodiment of the present invention.

FIG. 8 illustrates a D-lens and corresponding optical characteristics of the D-lens. In one embodiment of the invention, the D-lens 810 has a corresponding distance 840 of approximately 0.25 millimeters, which is defined as the distance between a lens surface 820 and a focus plane 830. This distance 840 is relatively small which facilitates a more compact design of a corresponding optical filter.

In one embodiment of the invention, the optical axis of the D-lens 810 is the same as its physical axis. This alignment of optical and physical axes reduces the tolerance caused by the lens to be approximately zero. Additionally, the D-lens 810 does not have a polish angle making it simpler to assemble because it does not need a special process to match the angles of a lens and pigtail. Furthermore, the D-lens 810 is made from a glass ball so that the outer diameter of the lens is easy to change according to a customer's requirement. Unlike the GRIN lens, which focuses light by a change of index within the lens (the GRIN lens is a gradual non-constant index lens), the D-lens 810 function is realized by one or two curved planes on the lens itself.

Figure 9:
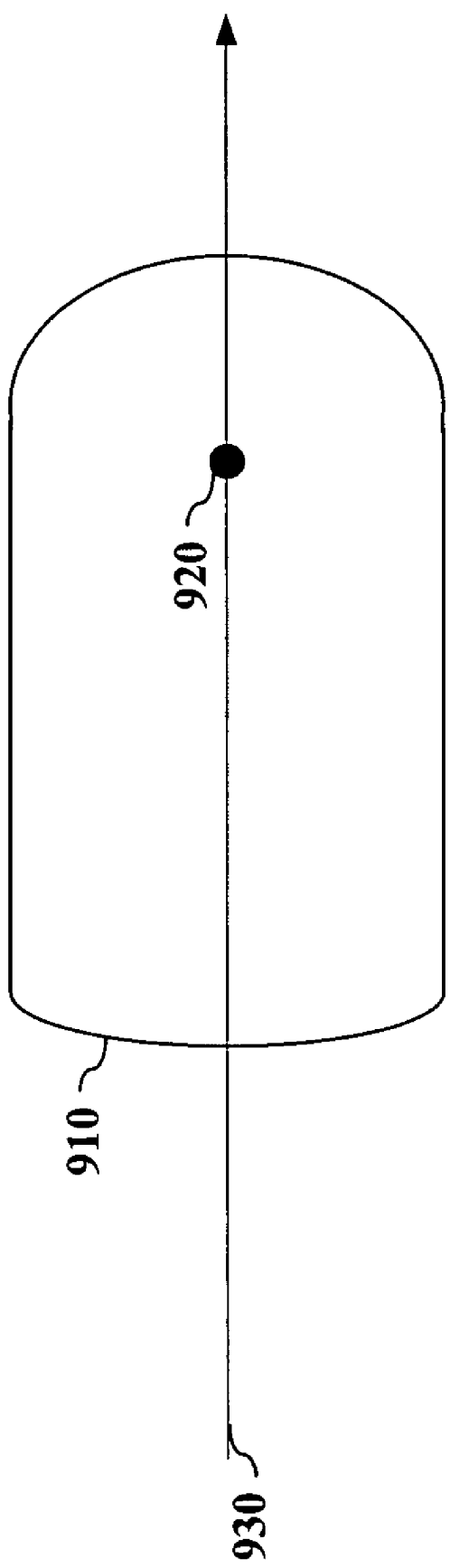
FIG. 9 is another illustration of a D lens and other optical characteristics thereof according to one embodiment of the present invention.

FIG. 9 illustrates a D-lens and optical performance characteristics according to one embodiment of the invention. As shown, a D-lens 910 has that focuses an incident light beam on a focus plane (not shown). The D-lens center 920 is located at the axis 930 of the lens so that there is not a shift between the axis 930 and ball center 920.

Other lenses, such as GRIN lenses and C-lenses, have a mismatch between the lens center and axis, which results in internal loss within the lens. For example, a C-lens is polished from a glass bar, which results in the center of the corresponding lens ball not being located at the axis of the bar. This mismatch is often caused by process deviation and causes optical light to not be parallel with the axis after passing the lens, which causes extra insertion loss in the design.

Comparatively, a D-lens is polished from a ball with its center located at the axis of the lens bar. Accordingly, the insertion loss described above is not present in the optical filter employing D-lenses as focusing lenses.

Figure 10:
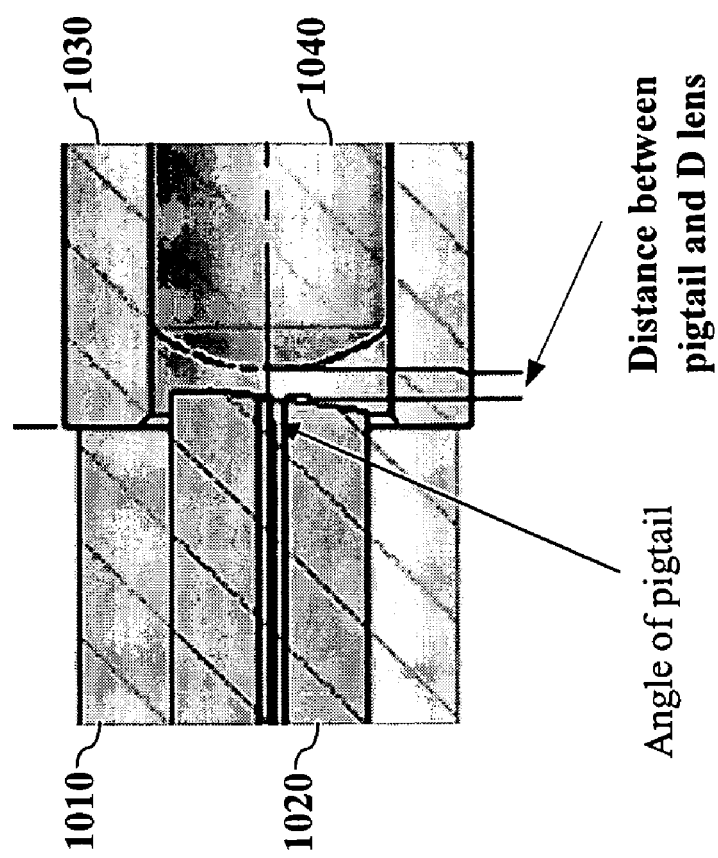
FIG. 10 is an illustration of a D lens and its coupling within an optical filter according to one embodiment of the invention.

FIG. 10 illustrates an alignment of a pigtail and focusing D-lens according to one embodiment of the invention. A pigtail tube 1010 surrounds an optical fiber pigtail 1020 which optically interfaces with a focusing D-lens 1040. The D-lens 1040 is surrounded by a center piece tube 1030 that protects and secures the D-lens 1040 in position.

As described above, the distance between the D-lens 1040 and the pigtail 1010 is relatively narrow due to the optical characteristics of the D-lens 1040. Additionally, there is no angle match required between the D-lens 1040 and the pigtail 1010 because the plane of the D-lens 1040 is a ball curve. However, if a C-lens or GRIN lens is used as the focusing lens, then a angles of the lens and the pigtail must be matched. Furthermore, as illustrated, the inner diameter of the pigtail tube 1010 is smaller than the inner diameter of the center piece tube 1030. These D-lens characteristics provide a more effective environment for alignment between a D-lens focusing lens and a pigtail.

While the present invention has been described with reference to certain exemplary embodiments, those skilled in the art will recognize that various modifications may be provided. Accordingly, the scope of the invention is to be limited only by the following claims.

We claim:

1. An optical filter device for filtering a wave division multiplexed signal, the filter comprising:
   a glass housing comprised of a plurality of glass tubes;
   a first D-lens, positioned within the glass housing, that optically interfaces with a first fiber pigtail and focuses an incident light beam from the first fiber pigtail;
   a WDM filter, positioned within the glass housing and relative to the first D-lens, that receives the focused incident light beam and passes at least one wavelength within the incident light beam;
   a second D-lens, positioned within the glass housing, that focuses the filtered light beam having the at least one wavelength into at least one transmission port in fiber pigtail; and
   wherein the first D-lens and the WDM filter are separated by a gap of approximately 0.25 millimeters.

2. The optical filter device of claim 1, wherein the glass housing comprises:
   a first glass pigtail tube that surrounds the first fiber pigtail;
   a second fiber pigtail;
   a second glass pigtail tube that surrounds the second fiber pigtail;
   and a glass center piece tube, coupled between the first glass pigtail tube and the second glass pigtail tube, that surrounds the WDM filter.

3. The optical filter of claim 2 wherein the first glass pigtail tube, the second glass pigtail tube, and the center piece tube are made of glass borate substances.

4. The optical filter of claim 2 wherein the center piece tube is coupled to the first and second pigtail tubes by an epoxy resin.

5. The optical filter of claim 2 wherein the inner diameters of the first glass pigtail tube and the second glass pigtail tube are smaller than the inner diameter of the center piece glass tube, and the first and second glass pigtail tubes extend beyond the center glass tube.

6. The optical filter of claim 5 wherein the inner diameter of the first and second glass pigtail tubes is 1.8 millimeters and the inner diameter of the center holding piece is 2.2 millimeters.

7. The optical filter of claim 1 wherein the first pigtail is dual fiber pigtail and the second pigtail is single fiber pigtail.

8. The optical filter of claim 1 wherein the WDM filter passes a single wavelength within the wavelength division multiplexed signal.

9. The optical filter of claim 1 wherein the first D-lens focuses at least one reflected wavelength into a least one reflective port in the first pigtail.

10. A method of optically connecting a first fiber pigtail and a second fiber pigtail, the method comprising:
    focusing an optical signal, communicated in the first fiber pigtail, using a first collimating D-lens;
    filtering the focused optical signal that is received from the first collimating D-lens using a filter;
    focusing the filtered optical signal into a transmission port of the second fiber pigtail using a second collimating D-lens;
    wherein the first and second collimating D-lenses are positioned within a glass housing;
    and wherein the first D-lens and the filter are separated by a gap of approximately 0.25 millimeters.

11. The method of claim 10 wherein the first fiber pigtail is dual fiber pigtail and the second fiber pigtail is single fiber pigtail.

12. The method of claim 11 further comprising the steps of:
    reflecting at least one wavelength within the focused optical signal; and
    focusing the at least one wavelength in at least one receptive port in the first fiber pigtail.

13. The method of claim 10 wherein the glass housing is comprises:
    a first pigtail tube that surrounds the first fiber pigtail;
    a second pigtail tube that surround the second fiber pigtail;
    a center piece tube that physically couples the first pigtail tube and the second pigtail tube; and
    wherein the center piece tube is coupled to the first and second pigtail tubes by an epoxy resin.

14. The method of claim 13 wherein the inner diameters of the first and second pigtail tubes is smaller than the inner diameter of the center piece tube, and the first and second glass pigtail tubes extend beyond the center glass tube.

15. The method of claim 14 wherein the first and second pigtail tubes and the center piece tube is made of a glass borate substance.

16. The method of claim 10 wherein a WDM filters the focused optical signal to a single wavelength signal.

* * * * *